United States Patent
König et al.

(10) Patent No.: US 6,426,381 B1
(45) Date of Patent: Jul. 30, 2002

(54) FINE-PARTICLE POLYMER DISPERSIONS FOR PAPER SIZING

(75) Inventors: Joachim König, Odenthal; Eckhard Wenz, Köln; Günter Sackmann; Thomas Roick, both of Leverkusen; Bernd Thiele, Odenthal; Gabriele Kinkel, Monheim; Johan Kijlstra, Bergisch Gladbach; Bernd Hauschel, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/622,136

(22) PCT Filed: Feb. 6, 1999

(86) PCT No.: PCT/EP99/00804
§ 371 (c)(1),
(2), (4) Date: Aug. 11, 2000

(87) PCT Pub. No.: WO99/42490
PCT Pub. Date: Aug. 26, 1999

(30) Foreign Application Priority Data

Feb. 18, 1998 (DE) .......................................... 198 06 745

(51) Int. Cl.⁷ .................................................. C08J 1/00
(52) U.S. Cl. .................. 524/734; 526/238.22; 526/319; 524/832; 524/833
(58) Field of Search ................................ 524/734, 832, 524/833; 526/915, 319, 238.22

(56) References Cited

U.S. PATENT DOCUMENTS

| | | | |
|---|---|---|---|
| 4,835,212 A | * 5/1989 | Degen et al. ................ 524/734 |
| 4,855,343 A | 8/1989 | Degen et al. .................. 524/47 |
| 4,931,510 A | 6/1990 | Sackmann et al. ........... 525/302 |
| 5,013,794 A | 5/1991 | Sackmann et al. ........... 525/203 |

FOREIGN PATENT DOCUMENTS

| EP | 400 410 | 4/1995 |
|---|---|---|
| JP | 58-115196 | 7/1983 |

OTHER PUBLICATIONS

Academic Press, Methods in Carbohydrate Chemistry, (month unavailable) 1964, Raymond R. Myers et al, [30a] Inherent Viscosity of Alkaline Starch Solutions, pp. 124–127.

Houben–Weyl, Methoden der Org. Chem. 4, Ed. vol. E20, pp. 2168, (date unavailable) Desoxy–Derivate der Stärke.

* cited by examiner

*Primary Examiner*—David W. Wu
*Assistant Examiner*—William Cheung
(74) *Attorney, Agent, or Firm*—Joseph C. Gil; Richard E. L. Henderson

(57) ABSTRACT

This invention relates to aqueous polymer dispersions obtained by free radical emulsion copolymerization of ethylenically unsaturated monomers comprising (a) 30 to 60% by weight of at least one optionally substituted styrene,
(b) 60 to 30% by weight of at least one $C_1$–$C_4$-alkyl (meth)acrylate, and
(c) 0 to 10% by weight of other ethylenically unsaturated copolymerizable monomers, in the presence of (d) 10 to 40% by weight of degraded starch having a molecular weight $M_n$ of 500 to 10,000, and
(e) a graft-linking, water-soluble redox system as free radical initiator for the free radical emulsion copolymerization, wherein the sum (a)+(b)+(c)+(d) is 100%.

14 Claims, No Drawings

FINE-PARTICLE POLYMER DISPERSIONS FOR PAPER SIZING

The invention relates to fine-particled, aqueous polymer dispersions based on styrene/(meth)acrylate copolymers, processes for their preparation and their use as sizes for paper, cardboard and board.

The polymer dispersions according to the invention are particularly suitable as sizes for the production of graphic papers which are used for modern printing processes since they both produce a good printed image by inkjet printing and have good toner adhesion, as required, for example, for use in laser printers or copiers.

Sizes for paper which are based on styrene/acrylate dispersions are known.

Thus, Japanese Application JP 58/115196 describes aqueous dispersions based on styrene/acrylate copolymers, grafted onto water-soluble high molecular weight polyhydroxy compounds including starch, as paper strength agents having a sizing effect. These graft copolymers are obtained by polymerizing styrene and an acrylate, such as n-butyl acrylate, in the presence of an aqueous solution of starch with the formation of an aqueous dispersion. In the process described, starch is used in high molecular weight form and is not further degraded before the polymerization. The initiators used, such as potassium peroxodisulphate, ammonium peroxodisulphate or 2,2'-azobis(amidinopropane) dihydrochloride, moreover have unsatisfactory grafting activity, so that only coarse-particled dispersions having a low grafting yield are obtained, which dispersions can be used for increasing the strength, but whose sizing effect is unsatisfactory. In particular, the sizing effect of these products declines on papers which have been engine-sized beforehand with alkyldiketene (AKD) or alkenylsuccinic anhydride (ASA), as are usually used for the production of graphic papers, and in the case of acidic inks as are used, for example, in the Hercules sizing test for testing the sizing effect.

European Patent Application EP-A 257 412 and EP-A 276 770 claim graft copolymers of acrylonitrile and acrylates on starch, which are likewise used in the form of fine-particled aqueous dispersions for paper sizing.

Fine-particled size dispersions which are obtained by emulsion polymerization of monomers, such as, for example, acrylonitrile, butyl acrylate or styrene, in the presence of polymeric anionic emulsifiers containing sulpho groups are furthermore known (cf. EP-A 331 066 and EP-A 400 410).

These dispersions known from the prior art have excellent performance characteristics in particular on neutral and chalk-containing papers. However, they have low stability to divalent and trivalent cations, such as, for example, $Ca^{2+}$ or $Al^{3+}$. Under unfavourable conditions in practice, this can lead to precipitates in the size press and hence to impairment of its sizing effect.

Fine-particled polymer dispersions of starch graft copolymers based on styrene/(meth)acrylates having improved performance characteristics have now been found.

The present invention relates to aqueous dispersions obtainable by free radical emulsion copolymerization of ethylenically unsaturated monomers in the presence of starch, characterized in that (a) 30 to 60% by weight of at least one optionally substituted styrene, (b) 60 to 30% by weight of at least one $C_1$–$C_4$-alkyl (meth)acrylate, (c) 0 to 10% by weight of other ethylenically unsaturated copolymerizable monomers are used as ethylenically unsaturated monomers, (d) 10 to 40% by weight of degraded starch having a molecular weight $M_n$=500 to 10,000 are used as starch, the sum (a)+(b)+(c)+(d) being 100%, and a graft-linking, water-soluble redox system is used as free radical initiator for the free radical emulsion polymerization.

Suitable monomers of group (a) are styrene and substituted styrenes, such as α-methylstyrene or vinyltoluene or mixtures thereof.

Suitable monomers of group (b) are $C_1$–$C_4$-alkyl acrylates, $C_1$–$C_4$-alkyl methacrylates or mixtures thereof, such as, for example, n-butyl, iso-butyl, tert-butyl or 2-butyl acrylate and the corresponding butyl methacrylates, and furthermore methyl acrylate, methyl methacrylate, ethyl acrylate, ethyl methacrylate, propyl acrylate or propyl methacrylate. A mixture of at least two isomeric butyl acrylates is preferred, it being possible for the mixing ratio to be 10:90 to 90:10. Mixtures of n-butyl acrylate and tert-butyl acrylate and mixtures of n-butyl acrylate and methyl methacrylate are particularly preferred.

Suitable monomers of the group (c) are further ethylenically unsaturated monomers, such as ethylhexyl acrylate, stearyl acrylate, stearyl methacrylate and further esters of acrylic and methacrylic acid with alcohols which have more than four C atoms, and furthermore acrylonitrile, methacrylonitrile, acrylamide, vinyl acetate or anionic comonomers, such as acrylic acid, methacrylic acid, styrenesulphonic acid. Particularly preferred monomers of group (c) are acrylic acid and styrenesulphonic acid.

The % by weight of components (a) to (d) relate to the total solids content of the dispersion, i.e. the sum of the amounts by weight of components (a) to (d).

Natural starches, such as potato, wheat, maize, rice or tapioca starch, are suitable as starch, potato starch being preferred. Starch types having a high amylopectin content of 80% or higher are preferably used. Potato starch having an amylopectin content >95% is particularly preferred.

It is also possible to use chemically modified starches, such as hydroxyethyl- or hydroxypropyl-starches, or starches which contain anionic groups, such as, for example, phosphate starch, or cationic starches which contain quaternized ammonium groups, a degree of substitution DS=0.01–0.2 being preferred. The degree of substitution DS indicates the number of cationic groups which are contained in the starch on average per glucose unit. Amphoteric starches which contain both quaternary ammonium groups and anionic groups, such as carboxylate and/or phosphate groups, and which optionally can also be chemically modified, for example hydroxyalkylated or alkyl-esterified, are particularly preferred.

The starch (d) to be used according to the invention is obtained by subjecting said starch types to oxidative, thermal, acidic or enzymatic degradation. Oxidative degradation of the starch is preferred. Oxidizing agents, such as hypochlorite, peroxodisulphate or hydrogen peroxide, or combinations thereof, which are preferably used in succession to establish the desired molecular weight of the starch, are suitable for the degradation. Starch degradation with hypochlorite, as usually carried out for improving the dissolution properties of the starch, and a further degradation, for example with hydrogen peroxide, which can be carried out, for example, shortly before the subsequent graft copolymerization, is particularly preferred. In this case, hydrogen peroxide (calculated as 100%) is used in concentrations of 0.3 to 5.0% by weight, based on starch employed. The amount of hydrogen peroxide depends on the molecular weight to which the starch is to be degraded.

The starches (d) degraded in this manner preferably have an average molecular weight $M_n$ of 500 to 10,000, with the result that, on the one hand, good dispersing of the emulsion polymers is ensured and, on the other hand, premature crosslinking and precipitation of the polymerization batch is avoided. The average molecular weight of the degraded starch can readily be determined by gel chromatographic analysis processes after calibration, for example with dextran standards, by known methods. Viscosimetric methods, as described, for example, in "Methods in Carbohydrate Chemistry"; Volume IV, Academic Press New York and Frankfurt, 1964, page 127", are also suitable for the characterization. The intrinsic viscosity thus determined is preferably 0.05 to 0.12 dl/g.

The polymerization is carried out as a rule by a procedure in which both the monomers, either individually or as a mixture, and the free radical initiators suitable for initiating the polymerization are added to the aqueous solution of the degraded starch.

To increase the dispersing effect, anionic or nonionic low molecular weight emulsifiers, such as sodium alkanesulphonate, sodium dodecylsulphate, sodium dodecylbenzenesulphonate, sulphosuccinic esters, fatty alcohol polyglycol ethers, alkylaryl polyglycol ethers, etc., can be added to the polymerization batch but as a rule impair the sizing effect and generally tend to undesired foam formation. The polymerization is therefore preferably carried out in the absence of emulsifiers.

However, polymeric anionic emulsifiers which contain sulpho groups, for example based on maleic anhydride copolymers or on star oligourethanes, as described; for example, in European Patent Application EP-A 331 066 and EP-A 400 410.

The polymerization is usually carried out in the absence of oxygen, preferably in an inert gas atmosphere, for example under nitrogen. During the polymerization, thorough mixing with the aid of a suitable stirrer should be ensured.

The polymerization can be carried out both by the feed process and by a batch process at temperatures between 30 and 100° C., preferably between 70 and 95° C. Temperatures above 100° C. are possible if a pressure reactor under superatmospheric pressure is employed. A continuous polymerization in a stirred kettle cascade or a flow tube is also possible.

In the feed process, which is preferred for obtaining a fine-particled dispersion, the monomers and the free radical initiator are metered uniformly into the starch solution in a stirred kettle. To achieve particular effects, nonuniform or staggered addition of individual components may also be effected. The reaction times are between 0.5 and 10 hours, preferably between 0.75 and 4 hours.

Graft-linking water-soluble redox systems are suitable for initiating the poly-merization. Conventional water-soluble initiators, such as potassium peroxo-disulphate, sodium peroxodisulphate, ammonium peroxodisulphate, hydrogen peroxide, etc., optionally in the presence of conventional reducing agents, such as sodium sulphite, sodium disulphite, sodium bisulphite, sodium dithionite, ascorbic acid and the sodium salt of hydroxymethanesulphinic acid, etc., are suitable for the polymerization but lead to coarse-particled dispersions which have only an inadequate degree of grafting and are unsatisfactory in their sizing effect. Furthermore, oil-soluble organic peroxides or azo initiators which are only slightly water-soluble are less suitable as free radical initiators since they give only unstable dispersions containing large amounts of coagulum, which are unusable for the desired purpose.

Suitable water-soluble initiator systems having high grafting activity are redox systems comprising hydrogen peroxide and heavy metal ions such as cerium, manganese or iron(II) salts, as described, for example, in Houben-Weyl "Methoden der organischen Chemie, [Methods of Organic Chemistry], 4th Edition, Volume E20, page 2168". The redox system comprising hydrogen peroxide and an iron(II) salt, such as iron(II) sulphate, which gives fine-particled dispersions having a high grafting yield, is particularly suitable. The grafting yield is understood as meaning the proportion of the polymer which is chemically coupled to the starch after the end of polymerization. The grafting yield should be as high as possible in order to achieve fine-particled and effective dispersions.

The polymerization is usually carried out in such a way that the heavy metal salt of the redox system, such as, for example, the iron(II) salt, is added to the batch before the polymerization, while hydrogen peroxide is metered in simultaneously with the monomers but separately. Iron(II) salt is usually used in concentrations of 10–200 mg/l $Fe^{++}$ ion, based on the total dispersion, higher or lower concentrations also being possible. Hydrogen peroxide (calculated as 100%) is added in concentrations of 0.2 to 2.0% by weight, based on monomer. This amount should be added to the amount of hydrogen peroxide which is used for the starch degradation.

In addition, the above-mentioned conventional initiators can be concomitantly used. The addition of further reducing agents, which are preferably initially introduced with the iron salt before the polymerization, has particular advantages. Suitable reducing agents are, for example, sodium sulphite, sodium disulphite, sodium bisulphite, sodium dithionite, ascorbic acid and the sodium salt of hydroxymethane-sulphinic acid.

The molecular weight of the grafted-on polymer can additionally be adjusted by the concomitant use of chain-transfer agents or regulators, such as, for example, n-dodecyl mercaptan, tert-dodecyl mercaptan, n-butyl mercaptan, tert-butyl mercaptan, etc.

Polymerization with the redox system comprising hydrogen peroxide and heavy metal ions give fine-particled dispersions having a good sizing effect. However, the polymerization generally seizes at conversions of, for example, 95 to 98%, based on monomer used, so that relatively high residual monomer contents remain, necessitating complicated monomer removal, for example by distillation and devolatilization in vacuo.

It was surprisingly found that the polymerization can be continued to very high conversion and to very low residual monomer content if an oil-soluble, sparingly water-soluble free radical initiator is added for subsequent activation after the polymerization with the water-soluble redox system, and the polymerization is completed therewith.

Suitable oil-soluble, sparingly water-soluble free radical initiators are, for example, customary organic peroxides, such as dibenzoyl peroxide, di-tert-butyl peroxide, tert-butyl hydroperoxide, cumyl hydroperoxide or bis-cyclohexyl peroxydicarbonate.

In this case, polymerization is first carried out, for example, with hydrogen peroxide and iron(l) sulphate, with high grafting yield to a conversion of about 95 to 98%, based on monomer used, and, for example, an oil-soluble, sparingly water-soluble organic peroxide is then added for subsequent activation, it being possible to achieve a conversion >99.8% and a residual monomer content <100 ppm and to dispense with monomer removal.

Here, sparingly water-soluble is intended to mean that less than 1% of the organic peroxide is completely soluble in water at room temperature.

In polymerization processes without subsequent activation, the residual monomer content is so high that subsequent monomer removal, for example by steam distillation or by passing in a gas stream, is required in order to keep the residual monomer content below required limits and to avoid odour annoyance during use. The grafting reaction with a water-soluble redox system, such as, for example, hydrogen peroxide and iron(II) sulphate, and the subsequent activation with a sparingly water-soluble organic peroxide, such as tert-butyl hydroperoxide, is therefore particularly preferred. Without adversely affecting the quality of the dispersion, it is thus possible to obtain residual monomer contents <100 mg/kg, so that complicated monomer removal can be dispensed with.

The polymerization is carried out at pH values of 2.5 to 9, preferably in the weakly acidic range at pH values of 3 to 5.5. The pH value can be adjusted to the desired value before or during the polymerization using customary acids, such as hydrochloric acid, sulphuric acid or acetic acid, or using bases, such as sodium hydroxide solution, potassium hydroxide solution, ammonia, ammonium carbonate, etc. Adjustment of the pH value to 5 to 7 after the polymerization with sodium hydroxide solution, potassium hydroxide solution or ammonia is preferred.

The concentration of the dispersions according to the invention is between 10 and 40% by weight, preferably between 18 and 30% by weight. The viscosity of a 25% strength dispersion is between 3 and 30 mPas.

The dispersions according to the invention have a very small particle size of less than 100 nm, preferably 50 to 90 nm. The particle size can be determined, for example, by laser correlation spectroscopy or by turbidity measurement. In the turbidity measurement of the polymer dispersions according to the invention, the latter, on dilution to an active ingredient content of 2.5% (1:10), have an absorbance between 0.25 and 1.2, measured in a 1 cm cell at 660 nm.

To increase the shelf-life, it is advantageous to bind the heavy metal ions used in the redox system subsequently to the polymerization by complexing agents, for which purpose complexing agents such as ethylenediaminetetraacetic acid, nitrilotriacetic acid, diethylenetriaminepentaacetic acid, polyaspartic acid, iminodisuccinic acid, citric acid or their salts are suitable. The amount of complexing agents used depends on the amount of heavy metal salt used. Usually, the complexing agents are used in concentrations of 1 to 10 mol, preferably in concentrations of 1.1 to 5 mol, per mol of heavy metal ion.

The polymer dispersions according to the invention are surface sizes having weakly anionic, amphoteric or cationic charge character and little tendency to foam formation, which have a broad application spectrum. They are suitable for surface sizing of all paper qualities produced in practice, for example of raw papers which are alum-containing, alum-free, filled with kaolin or chalk and containing groundwood or waste paper and which can be produced under acidic and under neutral or alkaline conditions and which may be unsized or may be presized in the paper pulp, for example with alkylketene dimer or alkenylsuccinic anhydride. Particularly those polymer dispersions according to the invention which contain a mixture of at least two isomeric (meth)acrylic acid ($C_1$–$C_4$) esters as monomer components are distinguished by an outstanding sizing effect on papers engine-sized beforehand and a substantially improved sizing effect with respect to acidic inks.

The dispersions according to the invention can be processed by all methods customary in surface sizing and can be applied to the surface of paper in the size press liquor. Use in aqueous solution together with 5 to 20% by weight of starch and optionally pigments and optical brighteners in the size press or in modern application units, such as a film press, speedsizer or gate-roll, is customary. The amount of size in the liquor depends on the desired degree of sizing of the papers to be finished. Usually, the concentration of the dispersions according to the invention in the liquor is between 0.1 and 2.0% by weight of solid substance, preferably between 0.2 and 1.0% by weight. The amount applied to the paper is determined by the liquid absorption of the optionally presized papers. The liquid absorption is to be understood as meaning the amount of size press liquor which, based on the dry fibre, can be absorbed by the latter and which can be influenced, inter alia, by the presizing in the paper pulp. Depending on the liquid absorption, the amount of size absorbed by the paper is 0.03 to 1.2% by weight of solid substance, based on dry fibre, preferably between 0.1 and 0.8% by weight.

In addition, the size press liquors may contain fine-particled pigments for improving the printability, such as, for example, chalk, precipitated calcium carbonate, kaolin, titanium dioxide, barium sulphate or gypsum. Furthermore, the addition of optical brighteners for increasing the whiteness, optionally with the addition of carriers, such as, for example, polyethylene glycol, polyvinyl alcohol or polyvinylpyrrolidone, is customary in the case of use on graphic papers. The good compatibility of the dispersions according to the invention with optical brighteners is particularly advantageous, so that papers having high whiteness can be obtained. Surprisingly, dispersions having amphoteric and cationic charge character can also be used together with optical brighteners without precipitates occurring or a decrease in the whiteness being observed, in contrast to customary cationic sizes.

Also particularly advantageous is the insensitivity of the dispersions according to the invention to the addition of electrolytes, such as Na, Ca or Al ions, which may in many cases be contained in the size press liquor, for example through migration from the raw paper to be processed, or are deliberately added for increasing the conductivity.

The size dispersions according to the invention are particularly suitable for the production of graphic papers which are used for all customary modern printing processes. In inkjet printing, for example, high ink adsorptivity and rapid drying without strike-through are required in combination with good ink hold-out, production of a high ink density and high resolution and good smudge and water resistance. In colour printing, crisp edges are required, and the individual coloured inks must not run into one another and should have high colour intensity, brilliance and lightfastness. These requirements can be met in an outstanding manner by the dispersions according to the invention. Dispersions having amphoteric or cationic charge character have particular advantages in the water fastness of the inkjet print through better fixing of the inkjet dye.

For using the papers treated with the dispersions according to the invention in electrophotographic printing processes, such as in laser printers or copiers, good toner adhesion is simultaneously required, i.e. the toner must adhere to the paper with high smudge resistance. This requirement, too, can be met in an outstanding manner by using the dispersions according to the invention on papers presized, for example, with alkyldiketene.

PREPARATION EXAMPLES

Example 1

124.5 g of oxidatively degraded potato starch (Perfectamyl® A 4692 from Avebe) are dispersed in 985 g of demineralized water and dissolved by heating to 86° C. under nitrogen in a 2 l flask having a plane-ground joint and a stirrer, reflux condenser and jacket heating. 42.7 g (1.54 mmol) of a 1% strength iron(II) sulphate solution and 116 g of a 3% strength hydrogen peroxide solution are added in succession and stirring is carried out for 15 min at 86° C.

After 15 minutes, the following two metering solutions are metered in simultaneously but separately at constant metering rate in the course of 90 min at 86° C.:
1) A mixture of 160.6 g of styrene, 80.3 g of n-butyl acrylate and 80.3 g of tert-butyl acrylate
2) 93.7 g of 3% strength hydrogen peroxide solution.

After the end of the metering, stirring is carried out for a further 15 min at 86° C. and 2 g of tert-butyl hydroperoxide are then added for subsequent activation. After a further 60 min at 86° C., cooling is effected to room temperature, 10 g of a 10% strength solution of ethylenediaminetetraacetic acid in the form of a tetrasodium salt are added and a pH value of 6.5 is established with 13 g of a 10% sodium hydroxide solution.

Filtration is effected through a 100 $\mu$m filter cloth, and a fine-particled dispersion having a solids content of 25.0% is obtained.

The fine-particled dispersion has a residual monomer content of 80 mg/kg of styrene, 90 mg/kg of n-butyl acrylate and 50 mg/kg of tert-butyl acrylate.

Turbidity values of a dispersion diluted to 2.5%: A=0.63 (660 nm, 1 cm cell) Mean particle size 74.5 nm (determined by laser correlation spectroscopy)

Example 2

67.0 g of an oxidatively degraded potato starch (Perfectamyl® A 4692) are dispersed with stirring in 536 g of demineralized water in a 2 l three-necked flask having a reflux condenser. The starch is dissolved by heating to 85° C., and 20.0 g of a 1% strength aqueous solution of $FeSO_4.7H_2O$ (0.72 mmol) and 4.0 g of 35% strength hydrogen peroxide are added in succession. After 15 minutes, the starch degradation is complete. The separate feed of the monomers and the initiator in the course of 90 min is then started at 85° C.
Solution 1: 86.6 g of styrene, 43.3 g of n-butyl acrylate, 43.3 g of tert-butyl acrylate
Solution 2: 4.3 g of hydrogen peroxide (35% strength) and 127 g of water 10 min after the end of the metering, a further 0.7 g of tert-butyl hydroperoxide are added for subsequent activation and stirring is carried out for a further 60 min.

Thereafter, cooling is effected to room temperature, filtration is performed through a 100 $\mu$m cloth and the pH is adjusted to 6 with sodium hydroxide solution (20% strength).

A fine-particled polymer dispersion having a solids content of 24.9% and a turbidity value of A=0.380 (diluted 1:10, 660 nm) is obtained. The mean particle size, measured by laser correlation spectroscopy, is 62 nm.

Example 3

124.5 g of oxidatively degraded potato starch (Perfectamyl® A 4692 from Avebe) are dispersed in 1005 g of demineralized water and dissolved by heating to 86° C. under nitrogen in a 2 l flask having a plane-ground joint and a stirrer, reflux condenser and jacket heating. 42.7 g (1.54 mmol) of a 1% strength iron(II) sulphate solution and 116 g of a 3% strength hydrogen peroxide solution are added in succession and stirring is carried out for 15 min at 86° C.

After 15 minutes, the starch degradation is complete. The following two metering solutions are metered in simultaneously but separately at a constant metering rate in the course of 90 min at 86° C.:
1) a mixture of 167 g of styrene, 68.5 g of n-butyl acrylate and 68.5 g of tert-butyl acrylate, and 17.1 g of acrylic acid.
2) 93.7 g of a 3% strength hydrogen peroxide solution.

After the end of the metering, stirring is carried out for a further 15 min at 86° C. and 1.2 g of tert-butyl hydroperoxide are then added for subsequent activation. After a further 60 min at 86° C., cooling is effected to room temperature and a pH value of 6.5 is established with ammonia.

Filtration is carried out through a 100 $\mu$m filter cloth, and a fine-particled dispersion having a solids content of 24.7% is obtained.

Turbidity value of a dispersion diluted to 2.5%: A=0.93, (660 nm, 1 cm cell). Mean particle size 78.6 nm (determined by laser correlation spectroscopy):

Example 4

124.5 g of oxidatively degraded potato starch (Perfectamyl® A 4692 from Avebe) are dispersed in 985 g of demineralized water and dissolved by heating to 86° C. under nitrogen in a 2 l flask having a plane-ground joint and a stirrer, reflux condenser and jacket heating. 42.7 g (1.54 mmol) of a 1% strength iron(II) sulphate solution and 116 g of a 3% strength hydrogen peroxide solution are added in succession and stirring is carried out for 15 min at 86° C.

After 15 minutes, the following two metering solutions are metered in simultaneously but separately at constant metering rate in the course of 90 min at 86° C.:
1) a mixture of 171.3 g of styrene, 85.6 g of n-butyl acrylate and 64.2 g of tert-butyl acrylate.
2) 93.7 g of a 3% strength hydrogen peroxide solution.

After the end of the metering, stirring is carried out for a further 15 min at 86° C. and 1.2 g of tert-butyl hydroperoxide are then added for subsequent activation. After a further 60 min at 86° C., cooling is effected to room temperature and a pH value of 6.5 is established with ammonia.

Filtration is carried out through a 100 $\mu$m filter cloth, and a fine-particled dispersion having a solids content of 24.9% is obtained.

Turbidity value of a dispersion diluted to 2.5%: A=0.69, (660 nm, 1 cm cell) Mean particle size 74.7 nm (determined by laser correlation spectroscopy):

Example 5

Example 1 is repeated with the use of only one butyl acrylate in the graft copolymerization.

124.5 g of oxidatively degraded potato starch (Perfectamyl® A 4692 from Avebe) are dispersed in 985 g of demineralized water and dissolved by heating to 86° C. under nitrogen in a 2 l flask having a plane-ground joint and a stirrer and jacket heating. 42.7 g (1.54 mmol) of a 1% strength iron(II) sulphate solution and 116 g of a 3% strength hydrogen peroxide solution are added in succession and stirring is carried out for 15 min at 86° C.

After 15 minutes, the following two metering solutions are metered in simultaneously and at constant metering rate in the course of 90 min:
1) a mixture of 160.6 g of styrene and 160.6 g of n-butyl acrylate
2) 93.7 g of a 3% strength hydrogen peroxide solution.

After the end of the metering, stirring is carried out for a further 15 min at 86° C. and 2 g of tert-butyl hydroperoxide are then added for subsequent activation. After a further 60 min at 86° C., cooling is effected to room temperature, 10 g of a 10% strength solution of ethylenediaminetetraacetic acid in the form of the tetrasodium salt are added and a pH value of 6.5 is established with 13 g of a 10% strength sodium hydroxide solution.

Filtration is carried out through a 100 μm filter cloth, and a fine-particled dispersion having a solids content of 24.9% is obtained.

Turbidity value of a dispersion diluted to 2.5%: A=0.57, (660 mn, 1 cm cell). Mean particle size 65.8 nm (determined by laser correlation spectroscopy):

Example 6

Subsequent Activation with $H_2O_2$

Example 2 is repeated, except that 0.6 g of hydrogen peroxide is used for the subsequent activation.

A fine-particled dispersion having acceptable sizing values is obtained (Table 1). However, the dispersion has high residual monomer contents of 1675 mg/kg of styrene, 960 mg/kg of n-butyl acrylate and 980 mg/kg of tert-butyl acrylate.

Example 7

Example 4 is repeated with the use of 171.3 g of styrene and 149.8 g of n-butyl acrylate.

A fine-particled dispersion having a solids content of 24.8% and a turbidity value of A=0.97 (diluted 1:10, 660 nm, 1 cm cell) is obtained.

Example 8

109.5 g of oxidatively degraded, cationic potato starch (Amylofax® 15, from Avebe) are dispersed in 1056.5 g of demineralized water and the starch is dissolved while stirring by heating to 86° C. under nitrogen in a 2 l flask having a plane-ground joint and a stirrer and jacket heating. 23.2 g of a 1% strength iron(II) sulphate solution and 105.1 g of a 3% strength hydrogen peroxide solution are added in succession, after which stirring is carried out for a further 15 min at 86° C.

Thereafter, the following two metering solutions are metered in simultaneously and at a constant metering rate in the course of 90 min:
1) Monomer mixture comprising 167.0 g of styrene, 83.5 g of n-butyl acrylate and 83.5 g of tert-butyl acrylate
2) 97.4 g of a 3% strength hydrogen peroxide solution After the end of the metering, stirring is carried out for a further 15 min at 86° C. and subsequent activation is then carried out by adding 2 g of tert-butyl hydroperoxide. After stirring for a further 60 min at 86° C., the dispersion is cooled to room temperature, 9.9 g of a 10% strength solution of ethylenediaminetetraacetate (in the form of the tetrasodium salt) are added and the pH is adjusted to 6.5 with 16 g of a 10% sodium hydroxide solution.

Filtration is effected through a polyamide filter having a mesh size of 100 μm, and a fine-particled dispersion having a solids content of 24.6% is obtained. The absorbance of a 2.5% solution prepared therefrom is 0.805 (660 nm, 1 cm cell).

Example 9

109.2 g of oxidatively degraded potato starch (Perfectamyl® A 4692, from Avebe) are dispersed in 1062 g of demineralized water and the starch is dissolved while stirring by heating to 86° C. under nitrogen in a 2 l flask having a plane-ground joint and a stirrer and jacket heating. 23.2 g of a 1% strength iron(II) sulphate solution and 71.4 g of a 3% strength hydrogen peroxide solution are added in succession, after which stirring is carried out for a further 15 min at 86° C.

Thereafter, the following two metering solutions are metered in simultaneously and at constant metering rate in the course of 90 min:
1) Monomer mixture comprising 145.6 g of styrene, 102.8 g of n-butyl acrylate and 85.6 g of methyl methacrylate
2) 97.4 g of a 3% strength hydrogen peroxide solution After the end of the metering, stirring is carried out for a further 15 min at 86° C. and subsequent activation is then effected by adding 2 g of tert-butyl hydroperoxide. After stirring for a further 60 min at 86° C., the dispersion is cooled to room temperature, 10 g of a 10% strength solution of ethylenediaminetetraacetate (in the form of the tetrasodium salt) are added and the pH is adjusted to 6.5 with 11.3 g of a 10% strength sodium hydroxide solution.

Filtration is effected through a polyamide filter having a mesh size of 100 μm, and a fine-particled dispersion having a solids content of 25.0% is obtained. The absorbance of a 2.5% strength solution prepared therefrom is 0.884 (660 nm, 1 cm cell).

Example 10

100.2 g of oxidatively degraded, cationic potato starch (Amylofax® 15, from Avebe) are dispersed in 926 g of demineralized water and the starch is dissolved while stirring by heating to 86° C. under nitrogen in a 2 l flask having a plane-ground joint and a stirrer and jacket heating. 23.2 g of a 1% strength iron(II) sulphate solution and 67.4 g of a 3% strength hydrogen peroxide solution are added in succession, after which stirring is carried out for a further 15 min at 86° C.

Thereafter, the following two metering solutions are metered in simultaneously and at constant metering rate in the course of 90 min:
1) Monomer mixture comprising 168.75 g of styrene, 78.75 g of n-butyl acrylate and 45.0 g of methyl methacrylate
2) 85.3 g of a 3% strength hydrogen peroxide solution After the end of the metering, 350 g of demineralized water are added to the reaction batch and stirring is carried out for a firer 15 min at 70° C. Subsequent activation is then carried out by adding 2 g of tert-butyl hydroperoxide. After stirring for a further 60 min at 70° C., the dispersion is cooled to room temperature, 10 g of a 10% strength solution of ethylenediaminetetraacetate (in the form of the tetrasodium salt) are added and the pH is adjusted to 6.5 with 12 g of a 10% strength sodium hydroxide solution.

Filtration is effected through a polyamide filter having a mesh size of 100 μm, and a fine-particled dispersion having a solids content of 19.8% is obtained. The absorbance of a 2.5% solution prepared therefrom is 0.900 (660 nm, 1 cm cell).

Use Examples

The surface treatment of various test papers with the dispersions according to the invention was carried out on a laboratory size press from Mathis, Zürich, type HF. The size liquor used was a solution of 5 parts by weight of oxidized potato starch (Perfectamyl® A 4692) and 0.8 to 1.8 parts of the dispersions according to the invention from Example 1–10, made up to 100 parts with water.

The sizing effect of the sizes according to the invention was tested on the following papers:

Paper a) comprising body paper presized with AKD, basis weight 80 g/m$^2$, liquid absorption 72%.

Paper b) unsized filler-containing raw paper, basis weight 80 g/m$^2$, liquid absorption 80%.

Paper c) unsized clay-and chalk-containing paper, basis weight 80 g/m$^2$, liquid absorption 70%.

The surface-sized papers were dried on a drying cylinder in the course of 1 minute at about 100° C. Before the sizing test, the papers were conditioned for 2 hours at room temperature.

To assess the degree of sizing of the surface-sized papers, the Cobb values according to DIN 53122 were determined. The Cobb value is defined as the water absorption of a paper sheet in the course of a wetting time of 60 sec, stated in g/m$^2$. The lower the Cobb value, the better is the degree of sizing of the treated papers.

Furthermore, the time to strike-through in the Hercules Sizing Test (test method according to Tappi T 530 pm-89) was determined. The longer the time to strike-through, the more advantageous is the degree of sizing of the treated papers.

The results of the performance tests are listed in Tables 1 and 2:

Comparative Example 1
(Not According to the Invention): peroxodisulphate as Initiator Example 2 is repeated, except that potassium peroxodisulphate is used instead of hydrogen peroxide.

67.0 g of an oxidatively degraded potato starch (Perfectamyl® A 4692) are dispersed in 536 g of demineralized water in a 2 l three-necked flask having a reflux condenser. The starch is dissolved by heating to 85° C., and 20.0 g of a 1% strength aqueous solution of FeSO$_4$.7H$_2$O and 4.0 g of a 35% strength aqueous hydrogen peroxide are added in succession. After 15 minutes, the starch degradation is complete. The separate feed of the monomers and of the initiator in the course of 90 min is then started at 85° C.

Solution 1: 86.6 g of styrene, 43.3 g of n-butyl acrylate, 43.3 g of tert-butyl acrylate Solution 2: 6.0 g of potassium peroxodisulphate in 127 g of water 10 min after the end of metering, a further 0.7 g of tert-butyl hydroperoxide is added for the subsequent activation and stirring is carried out for a further 60 min.

Thereafter, cooling is effected to room temperature, filtration is carried out through a 100 µm cloth and the pH is adjusted to 6 with sodium hydroxide solution (20% strength).

A stable polymer dispersion having a solids content of 25.7% and a turbidity value at 2.5% strength dilution (660 nm, 1 cm cell) of A=1.65 (diluted 1:10, 660 nm) is obtained.

The particle size, measured by laser correlation spectroscopy, is 104 nm.

In comparison with Example 2, this dispersion has a substantially coarser particle size and its sizing effect is inferior, as shown in Table 1.

Comparative Example 2
(Not According to the Invention): tert-butyl hydroperoxide as Initiator Comparative Example 2 is repeated, the following metering solutions being used:

Solution 1: 86.6 g of styrene, 43.3 g of n-butyl acrylate, 43.3 g of tert-butyl acrylate Solution 2: 10.1 g of tert-butyl hydroperoxide in 127 g of water A stable polymer dispersion having a solids content of 24.3% and a turbidity value at 2.5% strength dilution of A=2.8 (660 nm, 1 cm cell) is obtained. The particle size, measured by laser correlation spectroscopy, is 112 nm.

This dispersion, too, is substantially more coarse-particled than Example 2 and its sizing effect is substantially inferior.

Comparative Example 3
(Not According to the Invention)

Example 1 of Japanese Application JP 58/115196 is reworked as follows: 48 g of oxidatively degraded potato starch (Perfectamyl® A 4692 from Avebe) are dispersed in 1024 g of demineralized water and dissolved by heating to 90° C. under nitrogen in a 2 l flask having a plane-ground joint and a stirrer, reflux condenser and jacket heating.

After 15 min at 90° C., cooling is effected to 30° C. and 148.5 g of styrene and 111.4 g of n-butyl acrylate are added in succession while stirring.

After 10 min, a solution of 2.56 g of potassium peroxodisulphate in 128 g of water is added, heating is effected to 80° C. and stirring is carried out for 3 hours at this temperature. Thereafter, stirring is carried out for a further 3 hours at 90° C. and then cooling to room temperature.

Filtration is carried out through a 100 µm cloth, and a coarse-particled dispersion having a solids content of 20.8% is obtained Turbidity value A=0.60 (diluted 1:100, 660 nm). The mean particle size, measured by laser correlation spectroscopy, is 148 nm.

As shown in Table 1, the dispersion has an inadequate sizing effect.

TABLE 1

Results of the sizing test
Paper 1 Body paper, about 80 g/m$^2$, absorption 72%
Paper 2 Unsized filled paper, about 80 g/m$^2$, absorption 80%

|  |  | Example 1 | Example 2 | Example 3 | Example 4 | Example 5 | Example 6 | Example 7 | Comparison 1 | Comparison 2 | Comparison 3 |
|---|---|---|---|---|---|---|---|---|---|---|---|
| Solids content | % | 25.0 | 24.9 | 24.7 | 24.9 | 24.9 | 24.7 | 24.8 | 25.4 | 24.3 | 20.8 |
| Use, solid | % | 0.3 | 0.3 | 0.3 | 0.3 | 0.3 | 0.3 | 0.3 | 0.3 | 0.3 | 0.3 |
|  |  | 0.45 | 0.45 | 0.45 | 0.45 | 0.45 | 0.45 | 0.45 | 0.45 | 0.45 | 0.45 |
| Hercules Sizing |  |  |  |  |  |  |  |  |  |  |  |
| Paper 1 | sec | 85 | 140 | 93 | 65 | 52 | 61 | 45 | 51 | 34 | 4 |
|  |  | 148 | 169 | 176 | 135 | 90 | 115 | 100 | 101 | 75 | 19 |
| Paper 2 | sec | 40 | 153 | 35 | 35 | 23 | 31 | 10 | 23 | 18 | no sizing |
|  |  | 145 | 248 | 95 | 110 | 75 | 95 | 43 | 84 | 55 |  |

TABLE 1-continued

Results of the sizing test
Paper 1 Body paper, about 80 g/m², absorption 72%
Paper 2 Unsized filled paper, about 80 g/m², absorption 80%

|  |  | Example 1 | Example 2 | Example 3 | Example 4 | Example 5 | Example 6 | Example 7 | Comparison 1 | Comparison 2 | Comparison 3 |
|---|---|---|---|---|---|---|---|---|---|---|---|
| Cobb Test |  |  |  |  |  |  |  |  |  |  |  |
| Paper 1 | g/m² | 27.3 | 26.0 | 30 | 25.8 | 32 | 32 | 31 | 39 | 63 | >80 |
|  |  | 24.6 | 24.7 | 25.3 | 23.6 | 26.4 | 26.8 | 25.5 | 26.6 | 35 | 70 |
| Paper 2 | g/m² | 33.5 | 22.3 | 35 | 33 | 67 | 38 | >80 | 65 | 74 | no sizing |
|  |  | 22.2 | 20.4 | 24.3 | 22.8 | 26.1 | 22.6 | 27.5 | 25.1 | 33 |  |
| Absorbance 660 nm | Diluted 1:10 | 0.63 | 0.38 | 0.93 | 0.69 | 0.57 | 0.715 | 0.97 | 1.65 | 2.8 | about 6 (diluted 1:100) |
| Particle size | nm | 74.5 | 62.0 | 78.6 | 74.7 | 65.8 | 81 | 76.5 | 104 | 112 | 148 |

TABLE 2

Results of the sizing test

|  |  | Example 8 | Example 9 | Example 10 |  |  |  |
|---|---|---|---|---|---|---|---|
| Solids content | % | 24.6 |  | 25.0 |  | 19.8 |  |
| Use, solid Hercules Sizing Test | % | 0.2 | 0.3 | 0.2 | 0.3 | 0.2 | 0.3 |
| Paper 1 | sec | 88 | 157 | 46 | 104 | 71 | 133 |
| Paper 3 | sec | — | — | 139 | 147 | 124 | 152 |
| Cobb Test |  |  |  |  |  |  |  |
| Paper 1 | g/m² | 33 | 25.6 | 44 | 25.0 | 31 | 24.3 |
| Paper 3 | g/m² | — | — | 26.0 | 24.9 | 23.4 | 21.6 |
| Absorbance 660 nm | diluted to 2.5% | 0.81 |  | 0.88 |  | 0.90 |  |

Paper 1 Body paper, about 80 g/m², absorption 72%
Paper 3 Unsized clay- and chalk-containing paper, about 80 g/m², absorption 70%

What is claimed is:

1. An aqueous polymer dispersion obtained by free radical emulsion copolymerization of ethylenically unsaturated monomers comprising
    (a) 30 to 60% by weight of at least one optionally substituted styrene,
    (b) 60 to 30% by weight of at least one $C_1$-$C_4$-alkyl (meth)acrylate, and
    (c) 0 to 10% by weight of other ethylenically unsaturated copolymerizable monomers,
in the presence of
    (d) 10 to 40% by weight of degraded starch having a molecular weight $M_n$ of 500 to 10,000, and
    (e) a graft-linking, water-soluble redox system as free radical initiator for the free radical emulsion copolymerization,
wherein the sum (a)+(b)+(c)+(d) is 100%.

2. An aqueous polymer dispersion according to claim 1 wherein monomer component (b) is a mixture of at least two isomeric butyl acrylates.

3. An aqueous polymer dispersion according to claim 1 wherein monomer component (b) is a mixture of n-butyl acrylate and tert-butyl acrylate.

4. An aqueous polymer dispersion according to claim 1 wherein monomer component (b) is a mixture of n-butyl acrylate and methyl methacrylate.

5. An aqueous polymer dispersion according to claim 1 wherein starch (d) is a cationic starch having a degree of substitution DS of 0.01 to 0.2.

6. An aqueous polymer dispersion according to claim 1 wherein the graft-linking, water-soluble redox system is a combination of hydrogen peroxide and at least one heavy metal ion selected from the series consisting of cerium, manganese, and iron(II).

7. An aqueous polymer dispersion according to claim 1 having a solids content of 10 to 40%.

8. An aqueous polymer dispersion according to claim 1 wherein a 2.5% strength aqueous solution has an absorbance, measured in a 1 cm cell at 660 nm, of between 0.25 and 1.2.

9. A process for the preparation of an aqueous polymer dispersion according to claim 1 comprising polymerizing, in the presence of a graft-linking, water-soluble redox system,
    (a) 30 to 60% by weight of at least one optionally substituted styrene,
    (b) 60 to 30% by weight of at least one $C_1$-$C_4$-alkyl (meth)acrylate,
    (c) 0 to 10% by weight of other ethylenically unsaturated copolymerizable monomers, and
    (d) 10 to 40% by weight of degraded starch having an average molecular weight $M_n$ of 500 to 10,000,
wherein the sum of (a)+(b)+(c)+(d) is 100%.

10. A process according to claim 9 additionally comprising subsequently adding an oil-soluble, sparingly water-soluble free radical initiator.

11. A process according to claim 9 wherein the graft-linking, water-soluble redox system is a combination of hydrogen peroxide and at least one heavy metal ion selected from the series consisting of cerium, manganese, and iron (II).

12. A process according to claim 11 comprising adding a complexing agent for heavy metal ions subsequent to polymerization.

13. A process according to claim 9 wherein the graft-linking, water-soluble redox system is a combination of hydrogen peroxide and iron(II) and wherein 1 to 10 mol of a complexing agent for iron per mol of iron(II) is added subsequent to polymerization.

14. A method of surface sizing paper, board, or cardboard comprising applying an aqueous polymer dispersion according to claim 1 as a surface size into or onto paper, board, or cardboard.

* * * * *